United States Patent [19]

Noda

[11] 4,421,285
[45] Dec. 20, 1983

[54] FISHING REEL
[75] Inventor: Hideo Noda, Sakai, Japan
[73] Assignee: Shimano Industrial Company Limited, Osaka, Japan
[21] Appl. No.: 315,459
[22] Filed: Oct. 27, 1981
[30] Foreign Application Priority Data
Nov. 15, 1980 [JP] Japan ............................ 55-163674[U]
[51] Int. Cl.³ .............................................. A01K 89/00
[52] U.S. Cl. ................................................... 242/221
[58] Field of Search ............................. 242/211–221, 242/84.1 R; 254/901

[56] References Cited
U.S. PATENT DOCUMENTS
2,197,779  4/1940  Coxe .................................... 242/217
4,222,537  9/1980  Noda ................................... 242/212

Primary Examiner—Billy S. Taylor
Attorney, Agent, or Firm—Stevens, Davis, Miller & Mosher

[57] ABSTRACT

A fishing reel is disclosed as comprising a spool shaft having a spool supported to a reel body which has a pair of side walls opposite to each other, a pinion supported axially slidably and rotatably to said spool shaft, and a clutch provided between the spool shaft and the pinion, so that the spool shaft can be made freely rotatable relative to the pinion upon sliding movement of the pinion. The pinion has at an axially intermediate portion of its inner periphery an annular recess and at both axial sides thereof first and second bearing portions in contact with the outer periphery of the spool shaft. The spool shaft has at its outer periphery, and at a position opposite to the first bearing portion when the pinion axially slides to a position permitting the spool shaft to freely rotate, a smaller diameter portion which is larger in axial length than the first bearing portion.

3 Claims, 4 Drawing Figures

FISHING REEL

FIELD OF THE INVENTION

This invention relates to a fishing reel, and more particularly to a fishing reel which has a reel body having a pair of side walls opposite to each other, a spool shaft having a spool and jouralled to the side walls through a pair of bearings and projecting at one axial end axially outwardly from one side wall, a pinion constituting a drive mechanism and supported axially slidably and rotatably to the projecting portion of the spool shaft, and a clutch means provided between the spool shaft and the pinion, so that the pinion axially slides to operate the clutch means for allowing the spool shaft to freely rotate.

BACKGROUND OF THE INVENTION

Conventionally, such a fishing reel having the pinion supported axially slidably and rotatably to the projecting portion of the spool shaft has been well-known.

When a fishing line wound onto the spool is intended to be drawn out therefrom for casting, the pinion axially slides to disconnect the clutch means to allow the spool shaft and spool to freely rotate.

The fishing reel is provided at the side wall with a clutch lever having cam faces and movable forwardly and backwardly perpendicularly to the spool shaft and with an actuator engaging the pinion and movable axially of the spool shaft by a push of the clutch lever, so that the pushing force thereof is used to slide the pinion through the cam faces and acuator.

Therefore, the pinion, when axially slid by the clutch lever to allow the spool to freely rotate for casting the line, happens to be distorted and contacts with the projecting shaft portion, whereby the spool shaft may be subjected to a frictional resistance against its free rotation. As a result, the spool is hindered from its free rotation making it impossible to cast the line to a great distance.

SUMMARY OF THE INVENTION

In the light of the above problem, this invention has been designed. An object of the invention is to provide a fishing reel which keeps a spool in a condition of being completely freely rotatable without applying frictional resistance to the spool shaft, even if a pinion is distorted when sliding along the spool shaft, for the free rotation thereof, thereby permitting an angler to cast the line to a great distance.

This invention is so constructed that the pinion in the conventional fishing reel is provided at an axially intermediate portion of its inner periphery with at least one annular recess and at both axial sides thereof with at least two first and second bearing portions to contact with the outer periphery of a projecting portion axially projecting from the spool shaft, the projecting shaft portion being provided at the outer periphery thereof with a smaller diameter portion which is positioned opposite to the first bearing portion when the pinion axially slides to allow the spool shaft to freely rotate, the smaller diameter portion being larger in axial length than the first bearing portion. Accordingly, the first bearing portion, during the free rotation of the spool shaft, is positioned opposite to the smaller diameter portion so as not to contact with the projecting shaft portion, so that, even when torsion is imparted to the pinion, the spool shaft is subjected to less frictional resistance against its free rotation. As a result, the smooth rotation of spool permits the angler to cast the line to a greater distance than otherwise possible.

The second bearing portion at the pinion in the aforesaid construction, even during the free rotation of spool shaft, will contact with the projecting shaft portion, but its contact area is very small. Hence, the spool shaft is subjected to extremely less frictional resistance in comparison with the conventional one which contacts with the pinion almost throughout the axial length thereof, resulting in no fear that the spool shaft is hindered from its free rotation.

Consequently, the second bearing portion is preferably smaller in axial length than the first bearing portion and it is better to provide at the projecting shaft portion of the spool shaft the aforesaid first smaller diameter portion and a second smaller diameter portion corresponding to the second bearing portion.

These and other objects of the invention will become more apparent in the detailed description and examples which follow.

DETAILED DESCRIPTION OF THE INVENTION

Figure 1:
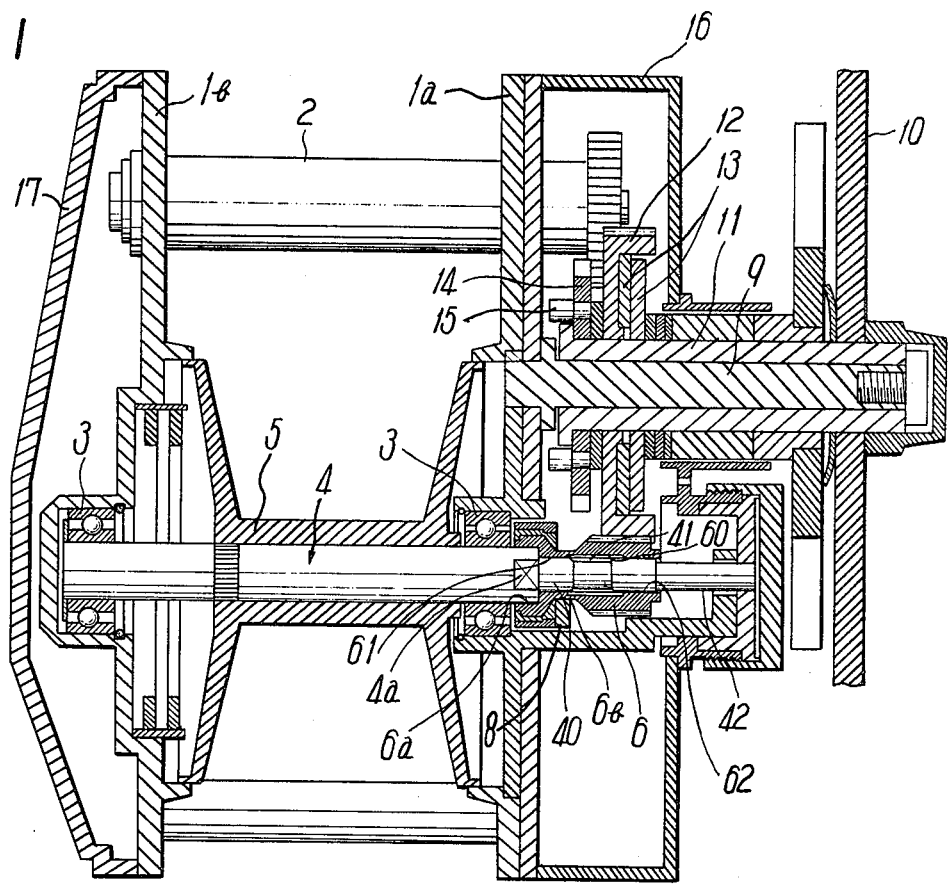
FIG. 1 is a longitudinally sectional view of an embodiment of a fishing reel of the invention.
Figure 2:
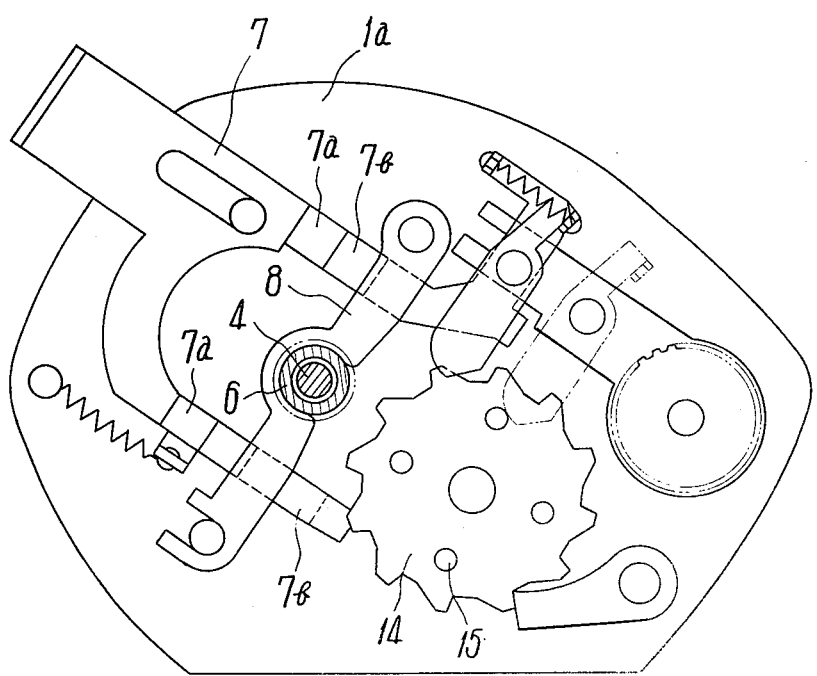
FIG. 2 is a side view of the reel in FIG. 1, from which a side cover is removed.

A fishing reel shown in the drawing has a reel body 1 comprising a pair of first and second side plates 1a and 1b opposite to each other and connected at a given interval by a plurality of rods 2 and a spool shaft 4 journalled to the side plates 1a and 1b through bearings 3, the spool shaft 4 carrying a spool 5 and having at one axial end a projecting shaft 40 projecting axially outwardly from one side wall 1a, the projecting shaft 40 supporting a tubular pinion 6 in relation of being rotatable and axially slidable, the pinion 6 constituting a drive mechanism to be hereinafter described.

A clutch face 4a is provided at the outer periphery of one axial end of spool shaft 4 at the projecting shaft 40 side, and a clutch face 6a engageable with clutch face 4a is provided at the inner periphery of one axial end of pinion 6, the clutch faces 4a and 6a constituting a clutch means. The pinion 6 is operated to axially slide and couples clutch face 6a with clutch face 4a to transmit a rotating force from pinion 6 to spool 5 through spool shaft 4. On the contrary, the clutch face 6a is disconnected from clutch face 4a to allow the spool shaft 4 together with spool 5 to freely rotate.

At the outside of one side plate 1a is provided a clutch lever 7 movable forwardly and backwardly perpendicularly to spool shaft 4, the clutch lever 7 having a forked end of legs 7b each having a cam face 7a. At the outside of clutch lever 7 is supported an actuator 8 movable axially of pinion 6 and engaging with an annular groove 6b formed at the outer periphery of pinion 6, so that the clutch lever 7 is pushed to move the actuator 8 axially of pinion 6 by use of cam faces 7a at the forked end of clutch lever 7, thereby slidably moving the pinion 6 rightward in FIG. 1 to disconnect the clutch means, thus allowing the spool shaft 4 to freely rotate.

When the pinion 6 returns or moves leftward, the clutch means is coupled to drive the spool shaft 4 by a driving force transmitted from the drive mechanism.

The drive mechanism comprises a handle bar 10, a master gear 12 driven by the handle bar 10 through a plurality of friction plates 13, and the pinion 6 in mesh with master gear 12, the handle bar 10 being mounted on a tubular handle shaft 11 sleeved rotatably onto a support rod 9 projecting outwardly from one side plate 1a, the handle shaft 11 carrying the master gear 12 and friction plates 13 so that the handle bar 10 is turned to rotate the master gear 12 through friction plates 13 and the pinion 6 is rotated to thereby drive the spool shaft 4 through the clutch means.

In the drawing, reference numeral 14 designates a return plate having a plurality of protrudents 15 engageable with clutch lever 7. The handle bar 10 is turned to return the clutch lever 7, whereby the actuator 8 is returned by a spring (not shown) to slide the pinion 6 leftward in FIG. 1 and couple the clutch means.

In addition, reference numerals 16 and 17 designate side covers each covering the outside of side plate 1a.

No further detailed description is required of the above construction, as a better understanding thereof will be gained by making reference to the well-known fishing reel.

A fishing reel of the invention is so designated that the pinion 6 in the aforesaid well-known fishing reel is provided at an axially intermediate portion of the inner periphery with an annular recess 60 and at both axial sides thereof with first and second bearing portions 61 and 62 to contact with the outer periphery of the projecting shaft portion 40 of spool shaft 4.

First and second smaller diameter portions 41 and 42 at spool shaft 4, larger in axial length than the first and second bearing portions 61 and 62, are formed at the outer periphery of projecting shaft portion 40 and at positions opposite to the bearing portions 61 and 62 respectively when the pinion 6 axially slides to allow the spool shaft 4 to freely rotate. Hence, gaps are formed between the bearing portions 61 and 62 and the smaller diameter portions 41 and 42 opposite thereto respectively, so that the pinion 6, even if distorted when operated by clutch lever 7 to slide axially along the projecting shaft portion 40, does not contact with projecting shaft portion 40, whereby the spool shaft 4 is subjected to no frictional resistance against its free rotation.

In the fishing reel of the invention constructed as the above, the clutch face 6a at pinion 6, as shown in FIG. 1, normally engages with clutch face 4a at spool shaft 4 and the spool 5 thereon is rotated by a driving force transmitted to pinion 6 from the handle bar 10 through the handle shaft 11, friction plates 13, and master gear 12, thereby winding a fishing line onto spool 5.

Figure 3:
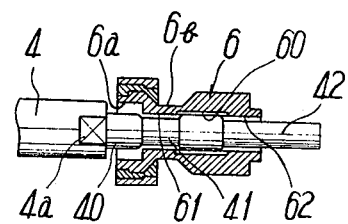
FIG. 3 is a sectional view showing sliding movement of a pinion in the reel in FIG. 1.

When the line is to be cast, the clutch lever 7 is pushed to slide axially along the projecting shaft portion 40 as shown in FIG. 3 and disconnect the pinion 6 from spool shaft 4 to make the spool shaft 4 and spool 5 freely rotatable.

At this time, the pinion 6 occasionally is subjected to torsion when slid by a push of clutch lever 7. However, the aforesaid first and second bearing portions 61 and 62 at pinion 6 and the aforesaid smaller diameter portions 41 and 42 at projecting shaft portion 40, are positioned opposite respectively to each other through the gaps during the free rotation of spool shaft 4, whereby the spool shaft 4, even if torsion occurs in pinion 6, is hardly subjected to a frictional resistance against its free rotation, thus enabling its smooth rotation together with spool 5.

Figure 4:
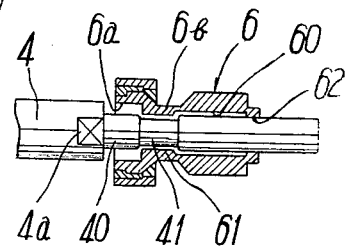
FIG. 4 is a sectional view of sliding movement of a pinion in a modified embodiment of the invention.

Alternatively, the pinion 6, as shown in FIG. 4, may be provided at an intermediate portion of the inner periphery with an annular recess 60 which is axially elongate toward a second bearing portion 62, which is made smaller in axial length to have a smaller contact area with the projecting shaft 40, the projecting shaft 40 forming thereon a smaller diameter shaft portion 41 only, so that, when the pinion 6 slides to allow the spool shaft 4 to freely rotate, the first bearing portion 61 only may be positioned opposite to the smaller diameter shaft portion 41 and the second bearing portion 62 may contact with projecting shaft portion 40.

In this instance, the smaller contact area of second bearing portion 62 with projecting shaft 40 reduces to a minimum the frictional resistance given to projecting shaft 40 even though the pinion 6 is distorted, resulting in no fear that the spool shaft 4 is hindered from its free rotation.

As seen from the above, the fishing reel of the invention, even if the pinion is distorted when the pinion slides to allow the spool shaft and spool to freely rotate, can restrict to a minimum the frictional resistance against the free rotation of spool shaft, thereby performing smooth rotation of the spool shaft and spool to ensure casting of the line to a great distance.

While preferred embodiments of the invention have been described using specific terms, such description is for illustrative purpose only, and it is to be understood that changes and variations may be made without departing from the spirit or scope of the invention which is defined in the following claims.

What is claimed is:

1. A fishing reel comprising:
a reel body having a pair of side walls opposite to each other;
a spool shaft having a spool shaft journalled to said side walls at said reel body, said spool shaft having a projecting shaft portion projecting axially outwardly from one of said side walls; and
drive mechanism for driving said spool shaft, said drive mechanism having a handle bar, a master gear driven by operation of said handle bar, a tubular pinion having a through bore in mesh with said master gear and a clutch means releasably coupling said pinion with said spool shaft so that rotation of said pinion induces rotation of said spool shaft when said pinion and spool shaft are coupled; said pinion being supported axially slidably and rotatably to said projecting shaft portion which passes through said through bore, said clutch means uncoupling said pinion and spool shaft when said pinion slides in a first direction and coupling said pinion and spool shaft when sliding in a second direction, said pinion being provided at an axially intermediate portion of its inner periphery with at least one annular recess and at both axial sides of said recess with at least first and second bearing portions in contact with the outer periphery of said projecting shaft portion, said projecting shaft portion having a first, smaller diameter portion larger in axial length than said first bearing portion at the outer periphery of said projecting shaft portion and at a position opposite to said first bearing portion when said pinion axially slides to allow said spool shaft to freely rotate.

2. A fishing reel according to claim 1, wherein said second bearing portion is smaller in axial length than said first bearing portion.

3. A fishing reel according to claim 1, wherein said projecting shaft portion of said spool shaft further has a second smaller diameter portion larger in axial length than said second bearing portion, at the outer periphery of said projecting shaft portion and at the positions opposite to said first and second bearing portions respectively when said pinion axially slides to allow said spool shaft to freely rotate.

* * * * *